(12) United States Patent
Andre et al.

(10) Patent No.: US 9,260,198 B2
(45) Date of Patent: Feb. 16, 2016

(54) DISPLAY SYSTEM FOR AIRCRAFT COCKPIT

(71) Applicant: Airbus Operations (SAS), Toulouse (FR)

(72) Inventors: Raphael Andre, Toulouse (FR); Yannick Deleris, Grenade (FR)

(73) Assignee: AIRBUS OPERATIONS (SAS), Toulouse (FR)

( * ) Notice: Subject to any disclaimer, the term of this patent is extended or adjusted under 35 U.S.C. 154(b) by 0 days.

(21) Appl. No.: 14/084,690

(22) Filed: Nov. 20, 2013

(65) Prior Publication Data

US 2014/0142790 A1    May 22, 2014

(30) Foreign Application Priority Data

Nov. 21, 2012  (FR) ..................... 12 61070

(51) Int. Cl.
| | |
|---|---|
| *G06F 7/70* | (2006.01) |
| *G06F 19/00* | (2011.01) |
| *G06G 7/00* | (2006.01) |
| *G06G 7/76* | (2006.01) |
| *B64D 45/00* | (2006.01) |
| *G06F 3/14* | (2006.01) |

(52) U.S. Cl.
CPC ............. *B64D 45/00* (2013.01); *G06F 3/1423* (2013.01); *G09G 2330/08* (2013.01); *G09G 2380/12* (2013.01)

(58) Field of Classification Search
USPC ................ 701/14, 121, 120, 400; 725/76, 75; 348/790, 14.08, 739; 345/8, 503, 504, 345/505, 418, 581, 618, 619; 340/945, 975, 340/974
See application file for complete search history.

(56) References Cited

U.S. PATENT DOCUMENTS

| | | | | |
|---|---|---|---|---|
| 4,000,419 | A | * | 12/1976 | Crost et al. .............. 250/214 VT |
| 5,907,568 | A | * | 5/1999 | Reitan, Jr. .................. 342/26 B |
| 6,057,786 | A | * | 5/2000 | Briffe et al. .................... 340/975 |
| 2004/0046680 | A1 | * | 3/2004 | Masuda et al. ................ 341/143 |
| 2004/0158364 | A1 | * | 8/2004 | Lafon et al. ........................ 701/3 |
| 2007/0046680 | A1 | * | 3/2007 | Hedrick et al. ............... 345/503 |
| 2009/0112380 | A1 | | 4/2009 | Nutaro et al. |
| 2010/0289963 | A1 | | 11/2010 | LeFort et al. |
| 2013/0076540 | A1 | * | 3/2013 | McLoughlin et al. ........ 340/945 |
| 2013/0250186 | A1 | * | 9/2013 | Bushell et al. ................ 348/790 |
| 2013/0276037 | A1 | * | 10/2013 | Bushell et al. .................. 725/76 |
| 2014/0114557 | A1 | * | 4/2014 | Nutaro et al. ................. 701/121 |
| 2014/0118623 | A1 | * | 5/2014 | Bushell et al. ................ 348/705 |
| 2014/0207314 | A1 | * | 7/2014 | Kou et al. ........................ 701/14 |

OTHER PUBLICATIONS

French Search Report, May 3, 2013.

* cited by examiner

*Primary Examiner* — Ronnie Mancho
(74) *Attorney, Agent, or Firm* — Greer, Burns & Crain, Ltd.

(57) ABSTRACT

A system including a switching device for switching an auxiliary display unit between a first state, corresponding to nominal operation, for which a screen of said auxiliary display unit is controlled by a control assembly of a main display unit, and a second, standby state, corresponding to a situation in which the main display unit has broken down, for which state said screen is controlled by a control assembly of said auxiliary display unit.

12 Claims, 3 Drawing Sheets

DISPLAY SYSTEM FOR AIRCRAFT COCKPIT

CROSS-REFERENCES TO RELATED APPLICATIONS

This application claims the benefit of the French patent application No. 12 61070 filed on Nov. 21, 2012, the entire disclosures of which are incorporated herein by way of reference.

BACKGROUND OF THE INVENTION

The present invention relates to a display system for the cockpit of an aircraft, in particular of a transport airplane.

It is known that, on airplanes, the data used in particular for flying, steering and navigation are presented to the crew primarily by means of two display systems: a control and display system (CDS) for nominal use and a standby navigation system (SNS) for emergencies, as set out below. For safety reasons, these two systems are independent from one another and different.

Conventionally, a CDS system is formed of different display units and supplies various data, in particular:
  primary flight data (altitude, attitude, speed, etc.);
  a (horizontal and vertical) navigation chart;
  engine parameters;
  the status of the aircraft;
  the status of systems and dedicated warnings; and
  various pages for determining and altering the flight plan, in order to manage communications with air traffic control and for supervisory purposes.

In recent versions, some of the formats displayed by a CDS system have been interactive.

Moreover, there are attempts to integrate more and more functions into CDS formats, in relation to, for example:
  navigation at an airport;
  maintenance functions;
  systems control;
  communications via data transmission, etc.

This has resulted in a significant increase in the total display surface area of the CDS system. At the same time, the size of each individual display unit of the CDS system is also increasing to allow the use of larger formats, such as airport maps. This has led to increases in the number of display units and the total display surface area.

Moreover, the SNS system can be used in particular (but not exclusively, as set out below) as a standby system in the event of a CDS system outage. The SNS system generally comprises:
  a pitot probe and a static probe; and
  one or more standby display units of the ISIS (or "integrated standby instrument system") type, comprising a small display surface and inertial sensors (accelerometers and gyrometers).

FR-2 784 457 relates to an ISIS standby display unit which displays piloting information (altitude, speed and attitude) for the aircraft on a screen.

The SNS system is formed so as to provide the functions which are essential for the crew to fly and steer the aircraft safely, until completion of the flight under way. The data displayed by an SNS system generally comprise:
  air data and inertial reference (altitude, air speed, attitude, etc.) parameters; and
  navigation information (crossings, etc.).

While the current display solution based on the CDS and SNS systems are entirely satisfactory on existing aircraft, said systems might show some limitations for future aircraft, in particular for the following reasons.

The operational perimeter of the CDS system increases from one program to the next, supplying the crew with more information and doing so in a smarter manner: the data are thus filtered, processed and presented visually, so as to be easily interpretable by the crew, and this only when necessary.

As regards the operational perimeter of the SNS system, this remains stable. Thus, from an operational perspective, there is a widening difference between the CDS and SNS systems. For the crew, it may become more complicated in the future to manage the transition over to the SNS system after the outage of the CDS system. Indeed, even if future CDS systems make it possible to limit the training of the crew in many situations owing to an intuitive interface and new functions, the crucial aspect of a pilot's training will concern flying the aircraft using the basic SNS system. The SNS system is, therefore, a curb on the evolution of pilot training.

A simple solution would be to increase the operational perimeter of the SNS system. However, this is not possible without increasing the surface area allotted to said SNS system within the cockpit. Yet, space is already limited within the cockpit, and the SNS system needs to located within the pilots' visual field and correctly oriented. Moreover, it needs to be easy to transition between the SNS and CDS systems. The only possible arrangement which meets these requirements would be on the instrument panel. However, the entire instrument panel is already taken up by CDS systems and installing thereon a standby system which will not generally be used is not necessarily a satisfactory solution.

SUMMARY OF THE INVENTION

The present invention relates to a display system for an aircraft cockpit, which allows the above-mentioned drawbacks to be remedied.

For this purpose, according to the invention, said display system, of the type comprising:
  at least one main display unit, preferably of the CDS type, which comprises:
    a first control assembly comprising at least a processor and a graphics card; and
    a first visualization screen, the display of which is controlled by said first control assembly, which is connected to said first visualization screen; and
  at least one auxiliary display unit, preferably of the SNS type, which comprises:
    a second control assembly comprising at least a processor and a graphics card; and
    a display means comprising at least one second visualization screen, the display of which is controllable by said second control assembly, which is connected to said first visualization screen,
  said main and auxiliary display units being different,
  is distinctive in that said first control assembly is also connected to said second visualization screen and capable of controlling the display by this second visualization screen, and in that said system additionally comprises switching means for switching said auxiliary display unit between:
    a first state, corresponding to nominal operation, for which state said second visualization screen is controlled by said first control assembly; and
    a second state, corresponding to a situation in which said main display unit has broken down, for which state said second visualization screen is controlled by said second control assembly.

Thus, the invention provides a display system which makes it possible:
- in nominal operation, that is to say in the absence of a breakdown (in particular of the main display unit), to increase the display surface area formed by two screens (said first and second visualization screens) which are controlled by the same (first) control assembly, preferably belonging to a main, CDS display unit; and
- to have a standby display in a breakdown situation (in particular of a main display unit).

Therefore, the display system according to the invention provides a standby display which, in addition to being able to perform the necessary standby functions, as set out below, is used in nominal operation as an additional standard display unit, such that the standby display operation does not needlessly take up space within the cockpit during nominal operation and the display surface area is increased.

Advantageously, said auxiliary display unit additionally comprises pressure sensors, accelerometers and gyrometers, which are capable of transmitting the measurements taken to said second control assembly.

Furthermore, advantageously, said second visualization screen is formed so as to display a standby format when said auxiliary display unit is brought into the second state, for which format standby information is presented, comprising at least piloting information and navigation information which are sufficient to allow the crew to fly and steer the aircraft safely, until completion of the flight under way. It is also conceivable for the standby format to present additional information to allow, for example, the crew to manage the communications and systems of the aircraft.

The auxiliary display unit can be used as a standby display unit for a CDS unit. In this case, the standby format can correspond to the format conventionally used by an SNS system.

However, said auxiliary display unit can also be used as a standby unit for an inertial reference system integrating the functions of an air data and inertial reference system (ADIRS) which, aside from being a display unit, also determines air data (for calculating, in particular, the speed and altitude of the aircraft) and inertial data for determining, in particular, the position and attitude of the aircraft. The auxiliary display unit is thus used as a standby system, particularly in the event of a breakdown of the various air data and inertial reference units (ADIRU) of said ADIRS system.

In this last embodiment, said switching means are thus formed so as to switch said auxiliary display unit from the first state, corresponding to nominal operation, to the second state, corresponding to a breakdown situation, when an inertial and air data system has broken down, in order to act as a standby system for said inertial and air data system. In this embodiment, the auxiliary display unit can receive the information to be displayed from either dedicated information sources or conventional information sources used by the ADIRS system (where only the display means of the ADIRS system malfunction).

Since it is a standby unit, the secondary display unit must therefore allow the minimum amount of aircraft flight information [piloting information (speed, altitude, attitude) and navigation information (waypoint)] to be displayed in the aircraft cockpit if a main display unit, in particular a CDS system or an ADIRS system, of the aircraft breaks down.

Said main and auxiliary display units can be produced in different ways within the scope of the present invention. In particular, as regards said main display unit:
- in a first embodiment, said first control assembly is integrated within a processing unit which is separate from a unit comprising said first visualization screen, and in that said first control assembly is connected to said first visualization screen; whereas
- in a second embodiment, said first control assembly and said first visualization screen are integrated within said main display unit.

Similarly, as regards said auxiliary display unit:
- in a first embodiment, said second control assembly is integrated within a processing unit which is separate from a unit of the display means comprising said second visualization screen, and said second control assembly is connected to said second visualization screen; whereas
- in a second embodiment, said second control assembly and said second visualization screen are integrated within said auxiliary display unit.

Moreover, advantageously, particularly with a view to preventing a breakdown from spreading, the connection between a control assembly and a visualization screen is a fiber-optic connection.

Furthermore, in a preferred embodiment, said switching means are integrated within the display means comprising said second visualization screen and comprise:
- supervision elements for automatically monitoring the signals transmitted by said first and second control assemblies; and
- switching elements for automatically switching said auxiliary display unit from one state to the other depending on the results of the supervision by said supervision elements.

Thus, owing to this preferred embodiment, the switching is automatic, in particular upon detection that the main display unit has broken down.

Furthermore, advantageously, said switching means also comprise a manual actuation element allowing an operator to perform a manual switching from one state to the other, generally, but not exclusively, from the first state, corresponding to nominal operation, to the second state, corresponding to a breakdown situation. In particular, this grants a pilot easy access to said second (standby) state for the auxiliary display unit, the manual switching taking precedence over an automatic switching.

Moreover, in a particular embodiment, said switching means are connected to internal diagnostics means of said main display unit.

The present invention also relates to a display assembly for an aircraft cockpit, comprising a plurality of "main" display units. According to the invention, this display assembly comprises at least one system of the aforesaid type, comprising at least one of said main display units (and an auxiliary display unit).

The present invention further relates to an aircraft, in particular to a civil or military transport airplane, comprising a display system and/or a display assembly of the aforesaid types.

BRIEF DESCRIPTION OF THE DRAWINGS

The figures of the accompanying drawings will make clear how the invention can be carried out. In these figures, like reference numerals denote like elements.

DETAILED DESCRIPTION OF THE PREFERRED EMBODIMENTS

The system 1 according to the invention is a system used, in particular, for display purposes which is intended for a cockpit of an aircraft (not shown), in particular a transport airplane, and designed to display to the crew any information which may be required or useful in particular in order to fly, steer and navigate the aircraft and to manage such operations.

Figure 1:
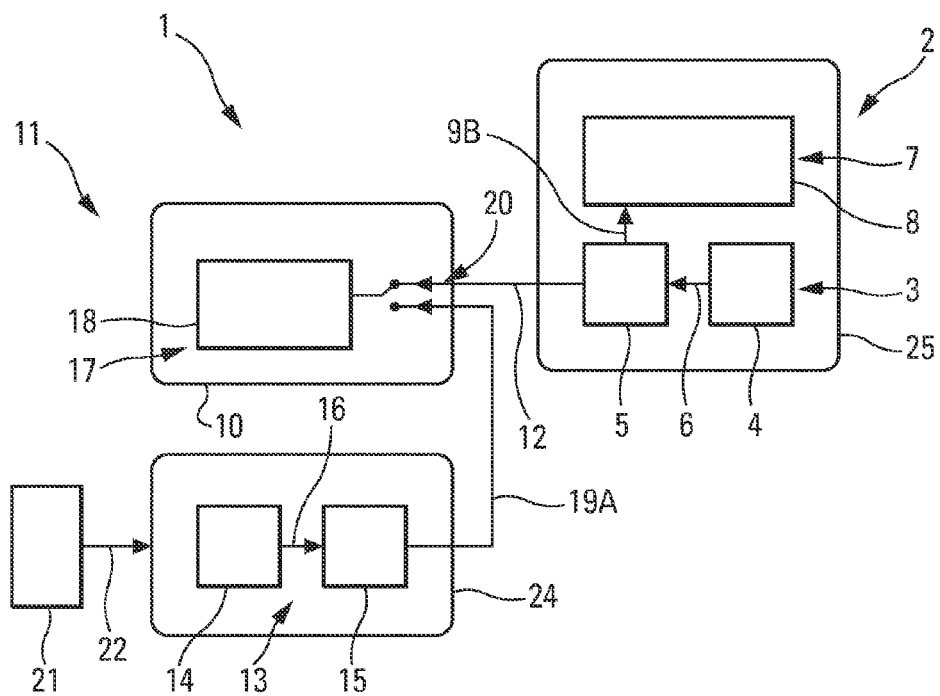
FIGS. 1 to 4 are block diagrams of a display system according to the invention, each showing one of four different embodiments.
Figure 2:
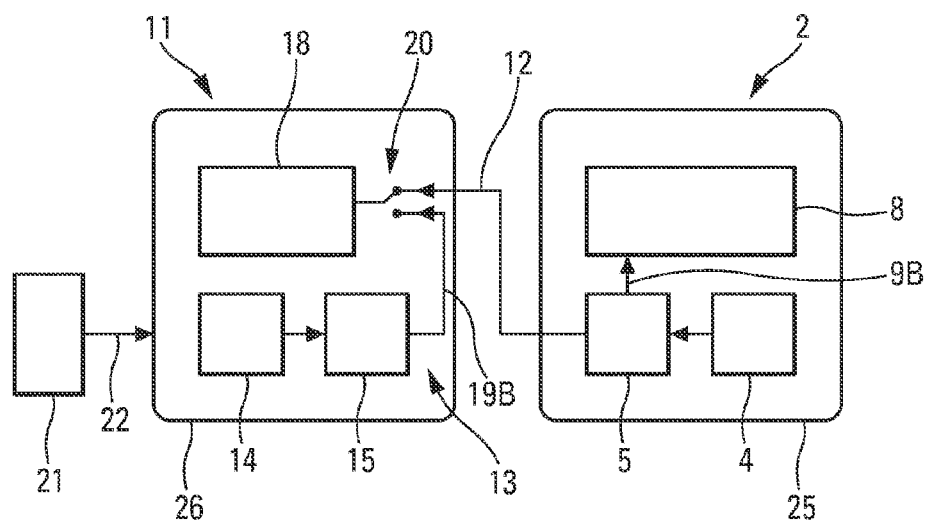
Figure 3:
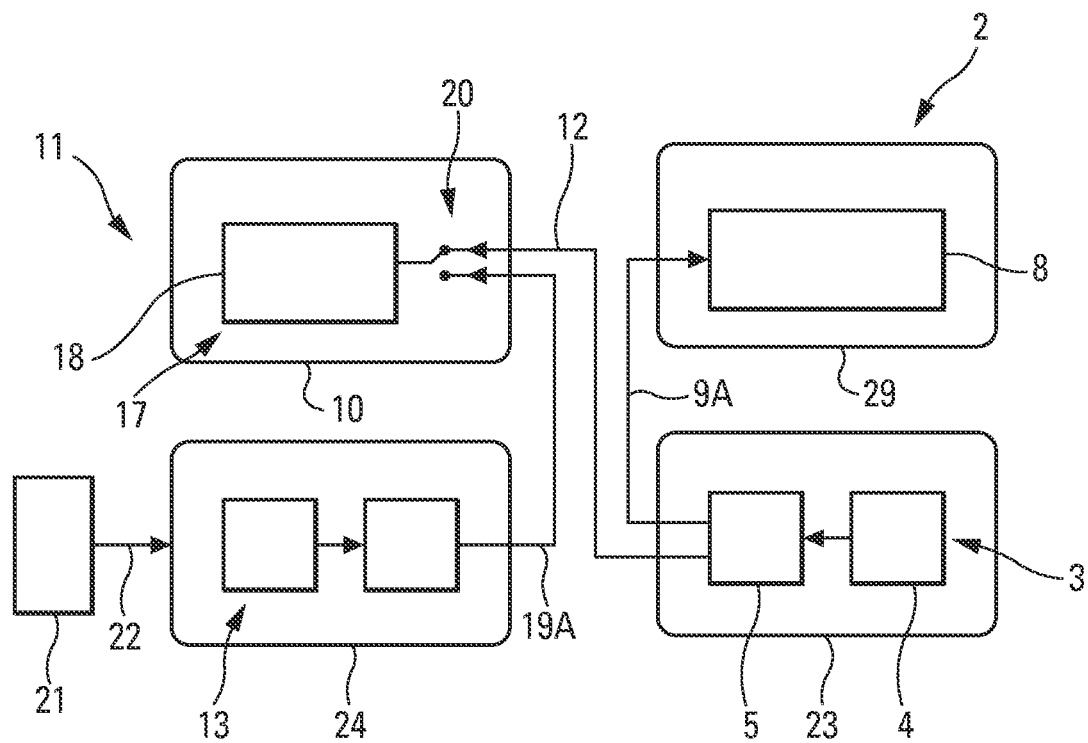

Said display system 1, which is thus on-board the aircraft, is of the type comprising, as shown in FIG. 1:
- at least one main display unit 2, preferably (but not exclusively) of the CDS type, which comprises:
  - a control assembly 3 comprising at least a conventional CPU processor 4 (or central processing unit), and a conventional GPU graphics card 5 (graphics processing unit) which is connected to said processor by a connection 6; and
  - a display means 7 comprising a visualization screen 8, the display of which is controlled by said control assembly 3, which is connected to said visualization screen 8, preferably of the LCD type, by a connection 9 (9A or 9B, depending on the embodiment); and
- at least one auxiliary display unit 11, preferably (but not exclusively) of the SNS type, which comprises:
  - a control assembly 13 comprising at least a CPU processor 14, and a GPU graphics card 15 which is connected to said processor by a connection 16; and
  - a display means 17 comprising a visualization screen 18, preferably of the LCD type, the display of which is controllable by said control assembly 13, which is connected to said visualization screen 18 by a connection 19 (19A or 19B, depending on the embodiment).

Moreover, said main and auxiliary display units 2 and 11 are different.

According to the invention, said control assembly 3 of the main display unit 2 is also connected to said visualization screen 18 of the auxiliary display unit 11 by a connection 12 and is capable of controlling the display by this visualization screen 18.

According to the invention, said system 1 also comprises switching means 20 which are capable of switching said auxiliary display unit 11 between:
- a first state, corresponding to nominal operation (where there is no breakdown of the main display unit 2), for which state said visualization screen 18 is controlled by said control unit 3 (of the main display unit 2); and
- a second state, corresponding to a situation in which said main display unit 2 has broken down, for which state said visualization screen 18 is controlled by said control assembly 13 (of the auxiliary display unit 11).

Said auxiliary display unit 11 also comprises a set 21 of information sources, which is connected by a connection 22 to, for example, the control assembly 13. Said set 21 of information sources preferably comprises pressure sensors, accelerometers and gyrometers, which are capable of taking, in a conventional manner, measurements relating to the aircraft and to its environment, and of transmitting the measurements taken to said control assembly 13. In a particular embodiment, set out below, said set 21 comprises all the information sources allowing the necessary information to be supplied to a standby unit of an ADIRS system.

Said display unit 2 can also comprise a set of information sources which is not shown in the figures since it does not fall within the scope of the present invention.

Thus, the display system 1 according to the invention makes it possible:
- in nominal operation, that is to say in the absence of a breakdown (in particular of the main display unit 2), to increase the display surface area formed by two screens (said visualization screens 8 and 18) which are controlled by the same control assembly 3, preferably belonging to a main, CDS display unit; and
- to have a standby display in a breakdown situation (in particular of the main display unit 2).

Therefore, the display system 1 according to the invention provides the crew of the aircraft with a standby display which, in addition to being able to perform the necessary standby functions, is used in nominal operation as an additional display unit, such that the standby display operation does not needlessly take up space within the cockpit during nominal operation and the display surface area is increased.

Moreover, since the entire display surface is thus managed by a single system (control assembly 3) in nominal mode, there is greater homogeneity among the graphical elements and formats, configuration changes are easier and it is possible for all the screens making up this entire display surface to share a means of interaction.

In basic use, the switching is performed in principle from the first state, corresponding to nominal operation, to the second state, corresponding to a breakdown situation. This takes place upon detection of a breakdown. However, the system 1 can also authorize switching from said second state to said first state, for example if a malfunction was only short-lived.

Within the scope of the present invention, the system 1 may comprise one or more main display units 2 and one or more auxiliary display units 11. It is also conceivable, in particular embodiments (not shown):
- for one and the same auxiliary display unit to be connected to a plurality of main display units and controllable by these main display units, by providing special switching rules between these display units, in particular a special priority order; and
- for one and the same main display unit to be connected to a plurality of auxiliary display units and capable of controlling all these auxiliary display units.

Said visualization screen 18 is also formed so as to display a "standby" format when said auxiliary display unit 11 is brought into said second state, for which format standby information is presented.

In the context of such a (display) unit, "standby information" means the minimum amount of aircraft flight information [piloting information (speed, altitude, attitude) and navigation information (waypoint)] that needs to be displayed in the aircraft cockpit if a main display unit 2, in particular a CDS system or an ADIRS system, breaks down, in order for the crew to be able to fly and steer the plane safely, until completion of the flight under way. It is also conceivable for the standby format to present, in a particular embodiment, additional information, in particular to allow the crew to manage the communications and systems of the aircraft.

Within the scope of the present invention, the auxiliary display unit 11 can be used as a standby display unit for a CDS unit 2. In this case, the standby format can correspond to the format conventionally used by an SNS system.

In this application, for which the display means 17 of the (SNS) system 11 is controlled by the (CDS) system 2 in nominal use, thereby allowing optimum use of the display surface and for it to be shared by the nominal and standby modes, there is no significant difference for the (CDS) system 2 compared with conventional display units. By contrast, the (SNS) system 11 must be able to receive two video inputs and to switch rapidly and safely from one to the other. Moreover, since the screen 18 is common to the two systems, independent and different means are preferably provided to ensure that a simple breakdown is not able to spread to the two systems and cause the complete outage of the display system in the cockpit, Moreover, in another embodiment (not shown), said display unit 11 can be used as a standby unit for an ADIRS system, which determines air data (for calculating, in particular, the speed and altitude of the aircraft) and inertial data for determining, in particular, the position and attitude of the aircraft and supplies useful information.

In this last embodiment, said switching means 20 are formed so as to switch said auxiliary display unit 11 from the first state, corresponding to nominal operation, to the second state, corresponding to a breakdown situation, when the inertial and air data system has broken down, in order to act as a standby unit for said inertial and air data system. In this embodiment, the auxiliary display unit 11 can receive the information to be displayed from:
- either dedicated information sources (belonging to the set 2), this allowing sensor breakdowns to be covered just as well as display breakdowns of the ADIRS system;
- or, in instances in which only the display means of the ADIRS system malfunction, conventional information sources used by the ADIRS system, this allowing coverage of a breakdown of said display means of the ADIRS system.

Said first and second display units 2 and 11 can be made in different ways, as shown in FIGS. 1 to 4. For this purpose, there are two main architectures. More specifically:
- according to a first architecture, hereinafter referred to as a "dual architecture", said control assembly 3, 13 is integrated within a processing unit 23, 24, which is separate from a display means 29, 10 comprising said visualization screen 8, 18, and said control assembly 3, 13 is connected to said visualization screen 8, 18 by an external connection 9A, 19A. Moreover, particularly in order to prevent a breakdown from spreading, said connection 9A, 19A is a fiber-optic (video) connection, like connection 12; and
- according to a second architecture, hereinafter referred to as an "integrated architecture", said control assembly 3, 13 and said visualization screen 8, 18 are integrated within a single assembly 25, 26 of said display unit 2, 11. The control assembly 3, 13 is connected to the visualization screen 8, 18 by a conventional electrical connection 9B, 19B.

Figure 4:
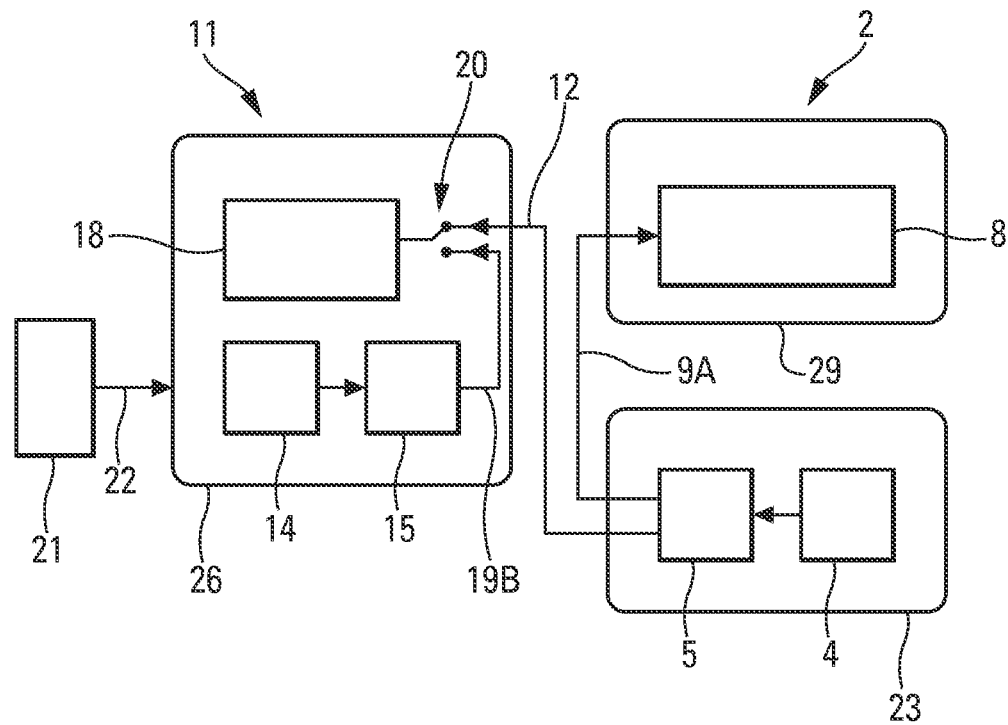

Each of these architectures can be applied to each of the units 2 and 11. Thus, any combination is possible, as shown in FIGS. 1 and 4. More specifically:
- in FIG. 1, the display unit 2 is in an integrated architecture and the display unit 11 is in a dual architecture;
- in FIG. 2, the display unit 2 and the display unit 11 are both in an integrated architecture;
- in FIG. 3, the display unit 2 and the display unit 11 are both in a dual architecture; and
- in FIG. 4, the display unit 2 is in a dual architecture and the display unit 11 is in an integrated architecture.

In addition to being insensitive to electromagnetic interference, the fiber-optic video connections have the advantage of ensuring an appropriate level of electrical segregation between the units, such that a breakdown in the display unit 11 cannot spread to the display unit 2. The ARINC 818 aeronautics video standard can be used for this purpose.

Figure 5:
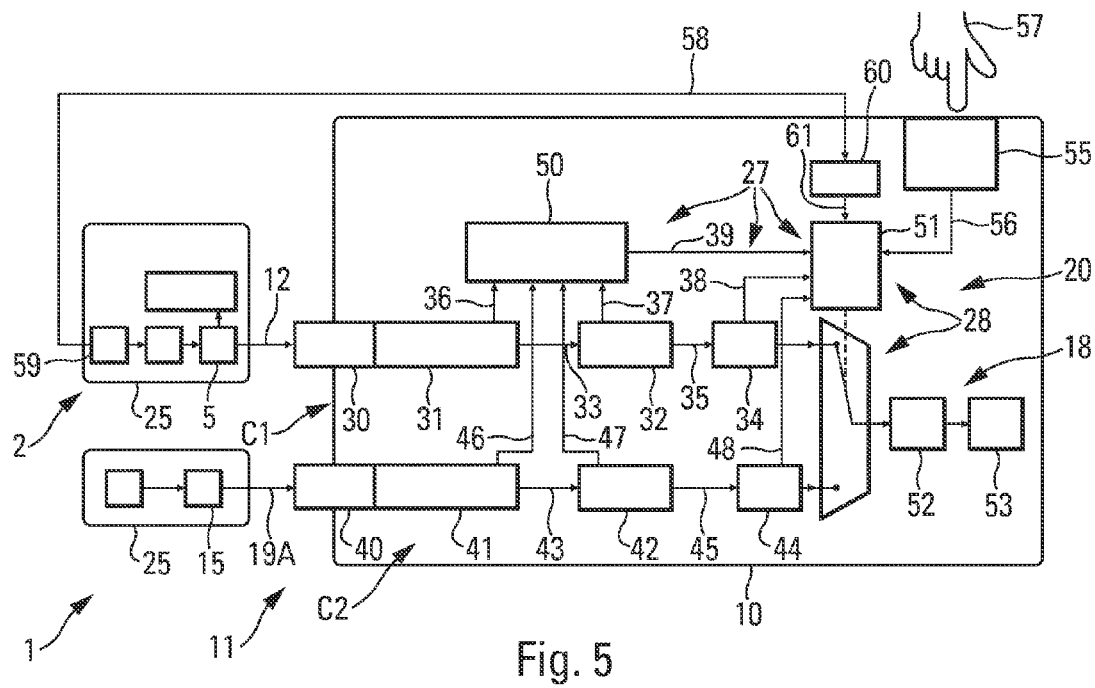
FIG. 5 schematically shows a preferred embodiment of particular means of an auxiliary display unit.

Furthermore, in a preferred embodiment, shown in FIG. 5 (which corresponds to the architecture in FIG. 1), said switching means 20 are integrated within the unit 10 comprising said visualization screen 18 and comprise:
- supervision elements 27 for automatically monitoring the signals transmitted by said control elements 3, 13; and
- switching means 28 for automatically switching said auxiliary display unit 11 from one state to the other depending on the results of the supervision by said supervision elements 25.

Thus, owing to this preferred embodiment, the switching is automatic, particularly upon detection that the main display unit 2 has broken down.

More specifically, in the embodiment in FIG. 5, the display means 10 comprises two information transmission chains C1 and C2.

The chain C1 receives the signals from the control assembly 3 of the display unit 2 via the connection 12 and comprises:
- an optical connector 30 which is connected to an optical receiver 31;
- a decoder 32, for example of the A818 type, which is connected by an electrical connection 33 to the optical receiver 31; and
- a means 34 for verifying the integrity of the signal, which is connected by a connection 35 to said decoder 32.

In the same way, the chain C2 receives the signals from the control assembly 13 of the display unit 11 via the connection 19A and also comprises:
- an optical connector 40 which is connected to an optical receiver 41;
- a decoder 42, for example of the A818 type, which is connected by an electrical connection 43 to the optical receiver 41; and
- a means 44 for verifying the integrity of the signal.

To prevent hidden breakdowns, it is necessary to verify the integrity of the video stream. The verification can monitor the invariant pixels which are specific to the format and compare their colours with the anticipated colours. It is also possible to verify particular moving images to detect when the image is frozen.

The means 10 also comprises:
- an active supervision unit 50 which is connected by connections 36 and 46 respectively to said optical receivers 31 and 41 and by connections 37 and 47 respectively to said decoders 32 and 42, and which verifies whether signals are received by these receivers 31 and 41 and these decoders 32 and 42. The active supervision unit 50 is thus able to detect a signal loss from one of the control assemblies 3 and 13, or at the chain C1 or C2; and
- switching means 51 which are connected by connections 38, 39 and 48 respectively to the means 34, 50 and 44 and which perform the switching, in the direction of means 52 for controlling the matrix 53 of the screen 18.

The automatic switching performed by the switching means 51 is preferably based on the detection of a system or video breakdown, by means of various supervision operations at various stages of the video chain:
- detecting the loss of the optical signal in the optical receiver 31, 41;
- detecting the loss of synchronization or an invalid CRC code in the video decoder 32, 42;
- detecting an incorrect or incomplete image; and
- detecting the loss of the life signal sent by the processing unit on the data communication network.

Furthermore, said switching means 20 also comprise a manual actuation element 55 connected by a connection 56 to the switching means 51 and allow an operator to perform a manual switching (a hand 57 is shown in FIG. 5) from one state to the other, generally, but not exclusively, from the first state, corresponding to nominal operation, to the second state, corresponding to a breakdown situation. This actuation element 55 allows a pilot, in particular, easy access to said second (standby) state from the auxiliary display unit 11. It can be used in particular to verify the availability of the standby display, prior to the flight. The manual control performed by means of the actuation element 55 takes precedence over an automatic control.

More generally, said means 51 manage priorities and operate logics between the various signals received.

Moreover, a connection 58 allows diagnostics information to be transmitted to the means 10, relating to automatic diagnostics implemented in the display unit 2 by means 59. This information, which indicates, for example, the state of the components of the display unit 2, indicates whether or not this display unit 2 is operating normally. This information is transmitted, via an interpretation element 60 and a connection 61, to the switching means 51. The switching means 51 automatically switch the unit 11 into standby operation if the unit 2 indicates via the connection 58 that said unit has broken down.

In the preferred embodiment in FIG. 5, the video chains C1 and C2 are duplicated as far as possible in the display unit 2, and the switching between the chains C1 and C2 is preferably performed as closely as possible to the (LCD) matrix 53, such that the breakdown of one component in a chain does not impact the other chain. The switching position can vary in the chain. It is even conceivable for it to be optical and to perform a switching directly after the optical inputs.

Within the scope of the present invention, there can be a number N of chains, N being greater than or equal to 2.

To meet safety requirements, differences in terms of material and software are implemented among all the components of the units 2 and 11, and in particular for:
the input/output interface controller;
the processor;
the graphics card;
the LCD matrix;
the operating system.

Differences in similarity in terms of software (including libraries), production, etc. are also conceivable.

The transition from one video chain to another in the event of a CDS outage is quick and secure. The period of time during which no data is displayed must be kept to a minimum such that the crucial data, such as the speed or altitude of the aircraft, remain available under all circumstances.

Figure 6:
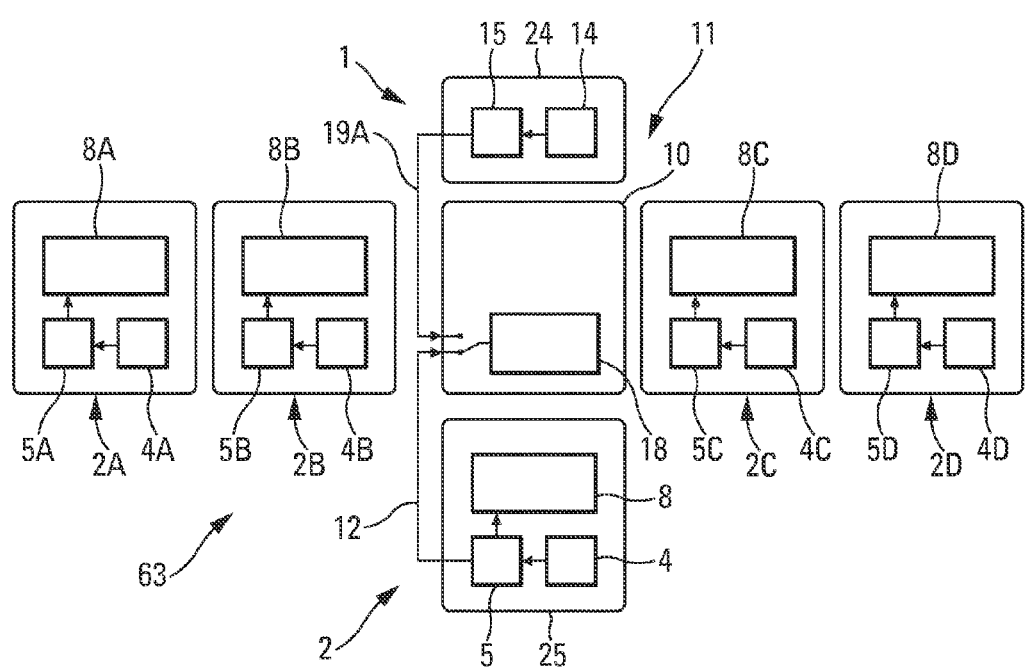
FIG. 6 schematically shows a possible architecture for a display assembly according to the invention, comprising a plurality of display units.

Moreover, FIG. 6 shows an embodiment of a display assembly 63 comprising, in addition to a display system 1 according to the invention (corresponding to the architecture in FIG. 1), a plurality of conventional display units 2A, 2B, 2C and 2D comprising elements 4A to 4D, 5A to 5D and 8A to 8D, of the same type as the elements 4, 5 and 8 of the main display unit 2. In this example, the arrangement for which is designed for a cockpit, the units 2A and 2B are intended for the pilot and the units 2C and 2D are intended for the co-pilot. Moreover, the display system 1 (and in particular its standby function) of said display unit 63, which is in a central position, can be used by the pilot and the co-pilot simultaneously.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A display system for an aircraft cockpit, comprising:
 (a) at least one main display unit which comprises:
   (i) a first information transmission chain that includes a first control assembly comprising at least a processor and a graphics card, the first control assembly coupled to a first optical receiver via a first optical connector, a first decoder coupled to the first optical receiver, a first signal integrity verifier coupled to the first decoder; and
   (ii) a first visualization screen, including a main display
   (iii) wherein the at least one main display unit is controlled by said first control assembly, which is connected to said first visualization screen;
 (b) at least one auxiliary display unit which comprises:
   (i) a second information transmission chain that includes a second control assembly comprising at least a processor and a graphics card, the second control assembly coupled to a second optical receiver via a second optical connector, a second decoder coupled to the second optical receiver, a second signal integrity verifier coupled to the second decoder; and
   (ii) at least one second visualization screen including an auxiliary display unit,
   (iii) wherein the at least one auxiliary display unit is controllable by said second control assembly, which is connected to said first visualization screen,
 (c) said at least one main display unit and at least one auxiliary display unit being different, said first control assembly also being connected to said second visualization screen and controlling images displayed by this second visualization screen; and
 (d) a switch configured to switch said auxiliary display unit between:
   (i) a first state, corresponding to nominal operation, for which state said first visualization screen and second visualization screen is controlled by said first control assembly such that a first set of flight information for nominal operation is displayed and spans both the first visualization screen and the second visualization screen; and
   (ii) a second state, corresponding to a situation in which said at least one main display unit has broken down, for which state said second visualization screen is controlled by said second control assembly such that a second set of flight information for breakdown operation is displayed on the second visualization screen,
 (e) wherein said second visualization screen is formed so as to display a standby format when said at least one auxiliary display unit is brought into said second state, for which format the second set of flight information is presented, comprising at least piloting information and navigation information for the aircraft;
 (f) wherein the display system enters the second state based on at least one of:
   (i) detecting a loss of an optical signal in the first optical receiver;
   (ii) detecting a loss of synchronization in the first decoder;
   (iii) detecting an invalid Cyclical Redundancy Check (CRC) code in the first decoder;

(iv) detecting an incorrect image to be presented on the first visualization screen;
(v) detecting loss of a signal sent by the processor in the first control assembly.

2. The system according to claim 1, wherein said first control assembly is integrated within a processing unit which is separate from a unit comprising said first visualization screen, and in that said first control assembly is connected to said first visualization screen.

3. The system according to claim 1, wherein said first control assembly and said first visualization screen are integrated within said at least one main display unit.

4. The system according to claim 1, wherein said second control assembly is integrated within a processing unit which is separate from a unit comprising said second visualization screen, and in that said second control assembly is connected to said second visualization screen.

5. The system according to claim 1, wherein said second control assembly and said second visualization screen are integrated within said at least one auxiliary display unit.

6. The system according to claim 2, wherein the connection between a control assembly and a visualization screen is a fiber-optic connection.

7. The system according to claim 1, wherein said switch is integrated within the at least one auxiliary display unit comprising said second visualization screen and comprises:
supervision elements for automatically monitoring the signals transmitted by said first and second control assemblies; and
switching elements for automatically switching said at least one auxiliary display unit from one state to the other depending on the results of the supervision by said supervision elements.

8. The system according to claim 1, wherein said switch is integrated within at least one main display Flail unit comprising said first visualization screen and comprises a manual actuation element allowing an operator to perform a manual switching from one state to the other.

9. The system according to claim 1, wherein said switch is integrated within at least one main display unit comprising said first visualization screen and is connected to internal diagnostics means of said at least one main display unit.

10. The system according to claim 1, wherein said at least one auxiliary display unit further comprises pressure sensors, accelerometers and gyrometers, which are capable of transmitting the measurements taken to said second control assembly.

11. The system according to claim 10, wherein said switch is formed so as to switch said at least one auxiliary display unit from the first state, corresponding to nominal operation, to the second state, corresponding to a breakdown situation, when an inertial and air data system comprising said at least one main display unit has broken down, in order to act as a standby system for said inertial and air data system.

12. An aircraft including a system, the aircraft comprising:
(a) at least one main display unit which comprises:
(i) a first information transmission chain that includes a first control assembly comprising at least a processor and a graphics card, the first control assembly coupled to a first optical receiver via a first optical connector, a first decoder coupled to the first optical receiver, a first signal integrity verifier coupled to the first decoder; and
(ii) a first visualization screen, including a main display
(iii) wherein the at least one main display unit is controlled by said first control assembly, which is connected to said first visualization screen;
(b) at least one auxiliary display unit which comprises:
(i) a second information transmission chain that includes a second control assembly comprising at least a processor and a graphics card, the second control assembly coupled to a second optical receiver via a second optical connector, a second decoder coupled to the second optical receiver, a second signal integrity verifier coupled to the second decoder; and
(ii) at least one second visualization screen including an auxiliary display unit,
(iii) wherein the at least one auxiliary display unit is controllable by said second control assembly, which is connected to said first visualization screen,
(c) said at least one main display unit and at least one auxiliary display unit being different, said first control assembly also being connected to said second visualization screen and controlling images displayed by this second visualization screen; and
(d) a switch configured to switch said auxiliary display unit between:
(i) a first state, corresponding to nominal operation, for which state said first visualization screen and second visualization screen is controlled by said first control assembly such that a first set of flight information for nominal operation is displayed and spans both the first visualization screen and the second visualization screen; and
(ii) a second state, corresponding to a situation in which said at least one main display unit has broken down, for which state said second visualization screen is controlled by said second control assembly such that a second set of flight information for breakdown operation is displayed on the second visualization screen,
(e) wherein said second visualization screen is formed so as to display a standby format when said at least one auxiliary display unit is brought into said second state, for which format the second set of flight information is presented, comprising at least piloting information and navigation information for the aircraft;
(f) wherein the display system enters the second state based on at least one of:
(i) detecting a loss of an optical signal in the first optical receiver;
(ii) detecting a loss of synchronization in the first decoder;
(iii) detecting an invalid Cyclical Redundancy Check (CRC) code in the first decoder;
(iv) detecting an incorrect image to be presented on the first visualization screen;
(v) detecting loss of a signal sent by the processor in the first control assembly.

* * * * *